United States Patent
Welk et al.

(10) Patent No.: US 7,896,493 B2
(45) Date of Patent: Mar. 1, 2011

(54) METHOD AND DEVICE FOR MANUFACTURING A SPECTACLE LENS AND COMPUTER PROGRAM PRODUCT FOR MANUFACTURING A SPECTACLE LENS

(75) Inventors: Andrea Welk, Munich (DE); Helmut Altheimer, Baisweil-Lauchdorf (DE)

(73) Assignee: Rodenstock GmbH, Munich (DE)

( * ) Notice: Subject to any disclaimer, the term of this patent is extended or adjusted under 35 U.S.C. 154(b) by 409 days.

(21) Appl. No.: 11/667,828

(22) PCT Filed: Sep. 29, 2005

(86) PCT No.: PCT/EP2005/010550

§ 371 (c)(1),
(2), (4) Date: Sep. 12, 2008

(87) PCT Pub. No.: WO2006/056261

PCT Pub. Date: Jun. 1, 2006

(65) Prior Publication Data

US 2009/0103046 A1    Apr. 23, 2009

(30) Foreign Application Priority Data

Nov. 19, 2004  (DE) .................. 10 2004 056 008
Dec. 9, 2004   (DE) .................. 10 2004 059 448

(51) Int. Cl.
*G02C 7/02* (2006.01)
(52) U.S. Cl. ...................... 351/177; 351/159
(58) Field of Classification Search .............. 351/177, 351/178
See application file for complete search history.

(56) References Cited

U.S. PATENT DOCUMENTS

| | | | |
|---|---|---|---|
| 6,637,880 B1 | 10/2003 | Yamakaji et al. | |
| 2003/0169397 A1 | 9/2003 | Reichow et al. | |
| 2007/0242220 A1* | 10/2007 | Guilloux et al. | 351/177 |
| 2007/0242221 A1* | 10/2007 | Guilloux et al. | 351/177 |

OTHER PUBLICATIONS

International Search Report w/English translation dated Dec. 29, 2005 (Four (4) pages).
Corresponding Written Opinion of the International Searching Authority (Form PCT/ISA/237) including Forms PCT/IB/338 and PCT/IB/373.

* cited by examiner

*Primary Examiner*—Scott J Sugarman
(74) *Attorney, Agent, or Firm*—Crowell & Moring LLP (57) ABSTRACT

The invention relates to a method comprising the following steps:—a bridge width (b), a glass length (l), and a frame glass angle ($f_F$) are predefined as eyeglass frame data;—a base curve (BK) as well as a nasal and a temporal facet position ($a_{Fn}$, $a_{Ft}$) are predefined as eyeglass lens data;—a user's pupil distance ($p_L$, $p_R$) is predefined as user data;—a horizontal angle of tilt ($f_G$) of the eyeglass lens (12) is determined at a reference point in the used position, the reference point being the point of intersection between the horizontal main beam facing the eye in the neutral viewing direction (NBR) of the user and the area (14) of the eyeglass lens which faces the object, and the horizontal angle of tilt ($f_G$) being the angle enclosed by a horizontal tangent (26) of the area (14) of the eyeglass lens (12) which faces the object at the reference point (B) and a straight horizontal reference line (HR) located on a plane that extends perpendicular to the horizontal main beam in the neutral viewing direction (NBR) of the user. Also disclosed are a device and a computer program product.

11 Claims, 3 Drawing Sheets

METHOD AND DEVICE FOR MANUFACTURING A SPECTACLE LENS AND COMPUTER PROGRAM PRODUCT FOR MANUFACTURING A SPECTACLE LENS

The present invention relates to a method, particularly for determining a horizontal tilt angle of a spectacle lens, for determining a spectacle lens, for providing a pair of spectacles, corresponding devices for performing the method, and a corresponding computer program product.

There is an ever greater call for optimum spectacles for sports. In particular, optimal optical supply tailored to the particular newest trendy type of sports is a theme in the corresponding optician and sport specialist magazines. Good vision in sports is important not only in regard to safety, but rather also in regard to sporting performance capability. Defective vision is often corrected by using contact lenses. However, not every athlete having defective vision has the possibility of correcting his vision errors using contact lenses. Problems with the compatibility of the contact lenses or the partially restricted capability of correction often represent an obstruction and make the use of a pair of spectacles having corresponding optical correction unavoidable.

In particular in very dynamic types of sports, which require rapid reactions, good vision is often the decisive parameter for good sporting performance. In addition, in many types of sports, such as skiing or bicycling, high velocities also place special requirements on the spectacle frames. These frames are to represent the most optimal possible combination of all-around vision, i.e., seeing/perceiving even when looking to the side, and protective function against wind.

Very large glass shapes often result from these requirements. In particular, glasses which are worn in sporting activities typically have spectacle frames which are curved so that they are tailored as much as possible to the shape of the head or face of the wearer. The adaptation to the head shape is typically achieved by a large frame glass angle. The frame glass angle is typically the angle at which the spectacle lens is inclined in relation to the bridge of the spectacle frame in a top view. In normal corrective frames, the frame glass angle is typically less than 6°. Spectacle lenses for use in bent spectacle frames, i.e., spectacle frames having a large frame glass angle, are already offered by diverse glass producers, the spectacle lenses typically being calculated and optimized for normal spectacle frames, i.e., spectacle frames which are not curved as strongly as the spectacle frames of sport spectacles, however.

High frame glass angles, in particular in sport spectacles, result in altered optical properties of the spectacle lens in the wearing position. Spectacle lenses which represent an optimum optical correction for defective vision must therefore be calculated specially. The high frame glass angle of the lens due to the bent frame in front of the eye must already be taken into consideration upon the calculation of the spectacle lens area to correct parasitic optical properties, such as astigmatic errors and/or prismatic errors, which arise in the spectacle lens. Furthermore, sport spectacles having a high frame glass angle also have high base curves, i.e., base curves having values greater than 7, which must accordingly be taken into consideration.

Typically, for example, an optician must find out by processing sample lenses which deviation from the specified eye interval he must maintain because of the high frame glass angle when grinding to achieve a correct result in regard to the centration, i.e., in regard to the position of the center point in front of the eye.

An optician therefore typically consumes multiple spectacle lenses until the spectacle lens is situated in the spectacle frame in such a way that the center point and the reference point are coincident. Spectacle lenses which are not correctly centered may typically not be reused. Furthermore, the experience which an optician has in regard to manufacturing sport spectacles plays a large role in keeping the number of sample spectacle lenses as low as possible, for example.

It is therefore an object of the present invention to specify parameters, taking the configuration of a spectacle lens in the wearing position into consideration, in particular for curved spectacle frames, which ensure an error-corrected definition of a spectacle lens.

This object is achieved by a method according to Claim 1, a method according to Claim 4, a method according to Claim 5, a device according to Claim 6, and a computer program product according to Claim 11. Preferred embodiment variations and/or embodiments are the subject matter of the dependent claims.

According to one aspect of the present invention, a method according to the present invention comprises the following steps:

predefining a bridge width, a glass length, and a frame glass angle as spectacle frame data;

predefining a base curve and a nasal and temporal facet position as spectacle lens data;

predefining an interpupillary distance of the user as user data;

determining a horizontal tilt angle of the spectacle lens in the wearing position at a reference point, the reference point being the intersection point of the eye-side horizontal main beam in the neutral viewing direction of the user with the object-side face of the spectacle lens;

the horizontal tilt angle being the angle which is enclosed by a horizontal tangent of the object-side face of the spectacle lens at the reference point with a straight horizontal reference line, and the straight horizontal reference line lying in a plane which is perpendicular to the horizontal main beam in the neutral viewing direction of the user.

The terms spectacle frame data, spectacle lens data, and user data are not to be understood as all-inclusive for this purpose, so that further spectacle frame data, spectacle lens data, and user data may also be predefined in addition to the particular specified data. For example, a distance of the center of the nasal facet from the object-side face of the spectacle lens, or the edge of the object-side face of the spectacle lens on the nasal side, and/or a distance of the center of the temporal facet from the object-side face, or the edge of the object-side face 14 on the temporal side may also be predefined as spectacle frame data. Preferably, the spectacle frame data, spectacle lens data, and user data are measured for determining the horizontal tilt angle. However, this data may also be stored in a databank after only being measured once and be taken from the databank at least partially if needed without all of this data having to be remeasured again to define the horizontal tilt angle.

Preferably, the tilt angle is calculated from the spectacle frame data, the spectacle lens data, and the user data. Such a calculation does not have to be performed for every user, however. Rather, it is also possible that multiple horizontal tilt angles are calculated for multiple sets of the above data and made available in a databank. Therefore, the horizontal tilt angle may be taken from the databank according to the spectacle frame data, the spectacle lens data, and the user data in particular. If the actual data is not provided in the databank, approximate values may be used, for example.

In the same way, it is also possible that the horizontal tilt angle is measured. For this purpose, for example, a semifinished spectacle lens or a sample spectacle lens having a known base curve is ground into the spectacle frame. The horizontal tilt angle may be defined and/or measured from the unfinished pair of spectacles using a corresponding angle measuring device. It is advantageously not necessary for the employed and/or semifinished spectacle lens to already have been individualized for a user. Rather it is possible for a possibly semifinished spectacle lens to be used for multiple spectacle frames for measuring the tilt angle if needed.

Because the inclination of the spectacle lens in front of the eye is solely responsible for the parasitic optical properties, such as induced prismatic and/or astigmatic errors, precise knowledge of the horizontal tilt angle at the reference point allows a corresponding correction of the parasitic optical properties by definition, in particular calculation or selection, of a suitable spectacle lens. However, if solely the frame glass angle is taken into consideration, a correction of these parasitic optical properties is only possible in a restricted way, because the frame glass angle does not correctly reflect the actual tilt of the spectacle lens in front of the eye.

The main beam in the meaning of the present invention is the object-side extension of the visual axis in the neutral viewing direction, the visual axis being the straight connection line between the object point imaged on the fovea and the center of the entry pupil of the eye. The visual axis is coincident with the object-side part of the main beam.

The neutral viewing direction in the meaning of the present invention is a viewing direction straight ahead horizontally, along the parallel visual axes. In particular, the neutral viewing direction is a direction in the primary position of the eye, i.e., in the position of the eye in relation to the head from which lateral turns and raising and lowering the eye occur without rolling. The primary position is approximately assumed with upright head and body posture when looking straight ahead into the distance. In other words, the primary position is the position of an eye in relation to the head for the case in which the eye looks at an object, which is located at eye height, with the viewing direction straight ahead.

The technical terms used for describing the present invention are used in accordance with relevant standards, as defined in DIN EN ISO 13666, for example, and/or in accordance with the technical terms as are used in the book *Optik und Technik der Brille [Optics and Technology of Spectacles]* by Heinz Diepes and Ralf Blendowske, published in 2002 by Verlag optische Fachveröffentlichungen GmbH, Heidelberg. The standards and the cited book thus represent an integral component of the disclosure of the present application.

A vertical direction in the meaning of the present invention is a direction which runs perpendicular to the neutral viewing direction and corresponds to a direction of exclusively lowering the gaze without lateral eye rotation. With linear head posture, the vertical direction as is used in the present invention typically corresponds to the vertical direction in the terrestrial reference system. The vertical direction in the meaning of the present invention deviates from the vertical direction of the terrestrial reference system if a person holds his head inclined in relation to the vertical direction of the terrestrial reference system, for example. The horizontal direction in the meaning of the present invention is a direction which is perpendicular to both the neutral viewing direction and also the vertical direction.

A facet in the meaning of the present invention basically corresponds to a typical facet, i.e., a projection on an edge of the spectacle lens, using which the spectacle lens is fastened in the spectacle frame. The position of the facet on the edge of the spectacle lens determines whether and possibly how much the object-side face and/or an edge of the object-side face of the spectacle lens projects beyond the spectacle frame in the neutral viewing direction.

The method of the present invention preferably comprises the further following steps:
predefining the variables of the optical defective vision of the user as further user data;
determining the spectacle lens on the basis of the predefined spectacle frame data, spectacle lens data, and user data while taking the horizontal viewing angle into consideration.

The spectacle lens may preferably be calculated on the basis of the predefined spectacle frame data, spectacle lens data, and user data. Parasitic optical properties, such as induced prismatic and/or astigmatic errors, which arise because of the horizontal tilt angle of the spectacle lens, may be corrected on the basis of the calculation. However, spectacle lenses which have already been calculated may also be used instead of calculating the spectacle lens. Prismatic and/or astigmatic errors are taken into consideration or corrected in such a way that using a concordance table, an alternative spectacle lens is used starting from an untilted spectacle lens. In other words, an alternative spectacle lens is used starting from a spectacle lens which has been defined, in particular calculated, without considering the horizontal tilt angle according to the spectacle frame data, spectacle lens data, and user data. The deviations of the optical properties of the alternative spectacle lens from the optical properties of the original spectacle lens precisely correspond to a correction of the parasitic optical properties which occur because of the positioning of the spectacle lens in front of the eye, i.e., because of the horizontal tilt angle.

According to a further preferred embodiment variation of the method of the present invention, the spectacle lens which was defined as described above is manufactured. Especially preferably, starting from the interpupillary distance of the user, a corrected interpupillary distance is defined taking the horizontal tilt angle into consideration, the corrected interpupillary distance being usable for fitting the spectacle lens into a spectacle frame. In other words, the actual interpupillary distance of the user is not taken into consideration when grinding and/or edging the spectacle lens. Rather, a corrected interpupillary distance is used for grinding and/or edging the spectacle lens. The corrected interpupillary distance results from the interpupillary distance of the user which is measured assuming a horizontal tilt angle which is not present. The spectacle lens is therefore edged in accordance with the corrected interpupillary distance, the interpupillary distance of the user being a physical dimension of the user and therefore remaining unchanged.

The corrected interpupillary distance may be calculated on the basis of the interpupillary distance of the user using the horizontal tilt angle. However, it is also possible for the corrected interpupillary distance to be taken from a table or data bank on the basis of the horizontal tilt angle, the data bank containing multiple corrected interpupillary distances which have been calculated for multiple value combinations of the above parameters. If the values of the spectacle frame data, spectacle lens data, user data, horizontal tilt angle, and interpupillary distance of the user are not present in the data bank, approximate values may be used for this purpose, for example. Furthermore, it is also possible not to provide absolutely corrected interpupillary distances in the data bank or table, but rather addition and/or multiplication factors, for example, on the basis of which the corrected interpupillary distance may be defined and/or calculated from the interpupillary distance of the user.

The exact tilt angle of the spectacle frame in front of the eye may be defined using the method according to the present invention, by which exact correction measures of the errors induced by the tilting are possible for the first time. In comparison to the typical methods cited at the beginning, the cited method according to the present invention is less time-consuming and costly. While typically multiple sample lenses are ground in the spectacle frame to manufacture a pair of sport spectacles, which, if they are not correctly centered, may typically no longer be used, empirical grinding attempts of this type may regularly be dispensed with in the present invention.

According to a further aspect of the present invention, a method for determining a spectacle lens comprises the following steps:

predefining a bridge width, a glass length, and a frame glass angle as spectacle frame data;
predefining a base curve and a nasal and temporal facet position as spectacle lens data;
predefining an interpupillary distance and dimensions of the optical defective vision of the user as user data;
predefining a horizontal tilt angle of the spectacle lens in the wearing position at a reference point;
determining the spectacle lens starting from the predefined spectacle frame data, spectacle lens data, and user data, taking the horizontal tilt angle into consideration,
the reference point being the intersection of the eye-side horizontal main beam in the neutral viewing direction of the user with the object-side face of the spectacle lens;
the horizontal tilt angle being the angle which is enclosed by a horizontal tangent of the object-side face of the spectacle lens at the reference point with a straight horizontal reference line, and
the straight horizontal reference line lying in a plane which is perpendicular to the horizontal main beam in the neutral viewing direction of the user.

According to a further aspect of the present invention, a method for providing a pair of spectacles comprises the following steps:

predefining the spectacle lens, which is defined starting from the predefined spectacle frame data, spectacle lens data, and user data taking a horizontal tilt angle at a reference point into consideration;
fitting the spectacle lens into a spectacle frame on the basis of a corrected interpupillary distance,
the corrected interpupillary distance being defined on the basis of the interpupillary distance of the user taking the horizontal tilt angle into consideration,
the reference point being the intersection of the eye-side horizontal main beam in the neutral viewing direction of the user with the object-side face of the spectacle lens;
the horizontal tilt angle being the angle which is enclosed by a horizontal tangent of the object-side face of the spectacle lens at the reference point with a straight horizontal reference line, and
the straight horizontal reference line lying in a plane which is perpendicular to the horizontal main beam in the neutral viewing direction of the user, i.e., which is perpendicular to a main beam in the primary position.

Preferably, the corrected interpupillary distance may be defined starting from the interpupillary distance of the user while additionally taking the base curve of the spectacle lens into consideration.

According to a further aspect of the present invention, a device is provided having:

a spectacle frame data detection unit, which is designed to detect a bridge width, a glass length, and a frame glass angle as spectacle frame data,
a spectacle lens data detection unit, which is designed to detect a base curve and a nasal and temporal facet position as spectacle lens data;
a user data detection unit, which is designed to detect an interpupillary distance of the user as user data;
a tilt angle definition unit, which is designed to define a horizontal tilt angle of the spectacle lens in the wearing position at a reference point,
the reference point being the intersection of the eye-side horizontal main beam in the neutral viewing direction of the user with the object-side face of the spectacle lens;
the horizontal tilt angle being the angle which is enclosed by a horizontal tangent of the object-side face of the spectacle lens at the reference point with a straight horizontal reference line, and
the straight horizontal reference line lying in a plane which is perpendicular to the horizontal main beam in the neutral viewing direction of the user.

Preferably, a device according to the present invention comprises a spectacle lens definition unit which is designed to define the spectacle lens starting from the predefined spectacle frame data, spectacle lens data, and user data while taking the horizontal tilt angle into consideration, the user data detection unit also being designed to detect dimensions of the optical defective vision of the user as further user data.

A device according to the present invention especially preferably comprises a spectacle lens manufacturing unit which is designed to manufacture the defined spectacle lens.

Furthermore, a device of the present invention preferably comprises an interpupillary distance correction unit, which is designed to define the corrected interpupillary distance starting from the spectacle distance of the user taking the horizontal tilt angle into consideration, the corrected interpupillary distance being usable for fitting the spectacle lens into a spectacle frame.

A device according to the present invention especially preferably comprises a spectacle lens fitting unit which is designed to fit the spectacle lens in a spectacle frame on the basis of the corrected interpupillary distance.

According to a further aspect of the present invention, a spectacle lens is provided having a bridge width, a glass length, and a frame glass angle as predefined spectacle frame data;
a base curve and a nasal and temporal facet position as predefined spectacle lens data,
an interpupillary distance and dimensions of the optical defective vision of the user being predefined as user data,
a horizontal tilt angle of the spectacle lens in the wearing position being defined and/or predefined at a reference point, and
the spectacle lens, starting from the predefined spectacle frame data, spectacle lens data, and user data being defined and/or manufactured taking the horizontal tilt angle into consideration,
the reference point being the intersection of the eye-side horizontal main beam in the neutral viewing direction of the user with the object-side face of the spectacle lens;
the horizontal tilt angle being the angle which is enclosed by a horizontal tangent of the object-side face of the spectacle lens at the reference point with a straight horizontal reference line, and the straight horizontal reference line lying in a plane which is perpendicular to the horizontal main beam in the neutral viewing direction of the user.

According to a further aspect of the present invention, a pair of spectacles is provided having a bridge width, a glass length, and a frame glass angle as predefined spectacle frame data;
a base curve and a nasal and temporal facet position as predefined spectacle lens data;
an interpupillary distance and dimensions of the optical defective vision of the user as predefined user data;
a horizontal tilt angle of the spectacle lens in the wearing position at a reference point,
a corrected interpupillary distance being defined starting from the interpupillary distance of the user taking the horizontal tilt angle into consideration;
the spectacle lens being fitted into a spectacle frame on the basis of a corrected interpupillary distance;
the reference point being the intersection of the eye-side horizontal main beam in the neutral viewing direction of the user with the object-side face of the spectacle lens;
the horizontal tilt angle being the angle which is enclosed by a horizontal tangent of the object-side face of the spectacle lens at the reference point with a straight horizontal reference line, and
the straight horizontal reference line lying in a plane which is perpendicular to the horizontal main beam in the primary position of the user.

Preferred embodiment variations and preferred embodiments of the present invention are described for exemplary purposes on the basis of the following schematic figures.

Figure 1:
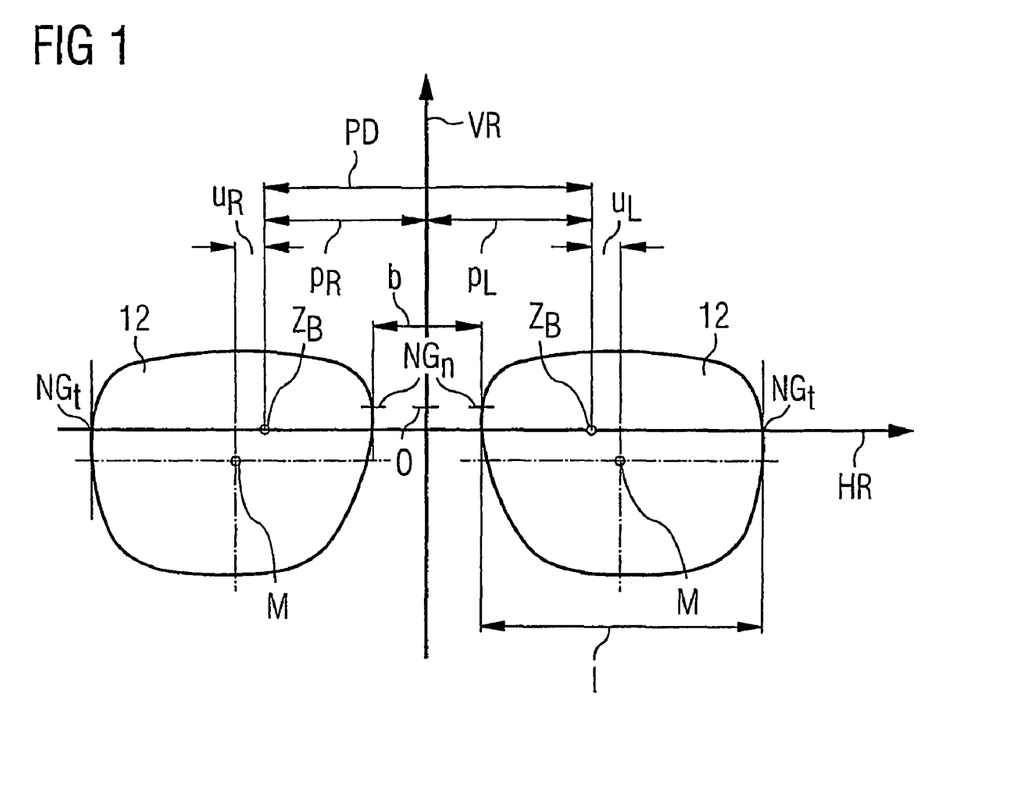
FIG. 1 shows a frontal view of a conventional spectacle lens configuration.

FIG. 1 shows a schematic view of a typical spectacle lens configuration having dimensions and references as they are used in a boxing system. A typical boxing system is described, for example, in DIN 58208 or in DIN EN ISO 13666. A single interpupillary distance $p_R$ and a single interpupillary distance $p_L$ are shown in FIG. 1. An interpupillary distance PD results from the sum of the single interpupillary distance $p_R$ and the single interpupillary distance $p_L$. The single interpupillary distance $p_R$ or $p_L$ corresponds to a sum of the distance of the centration point ZB from the nasal groove base $NG_n$ in the horizontal direction HR and a half bridge width b.

Figure 2:
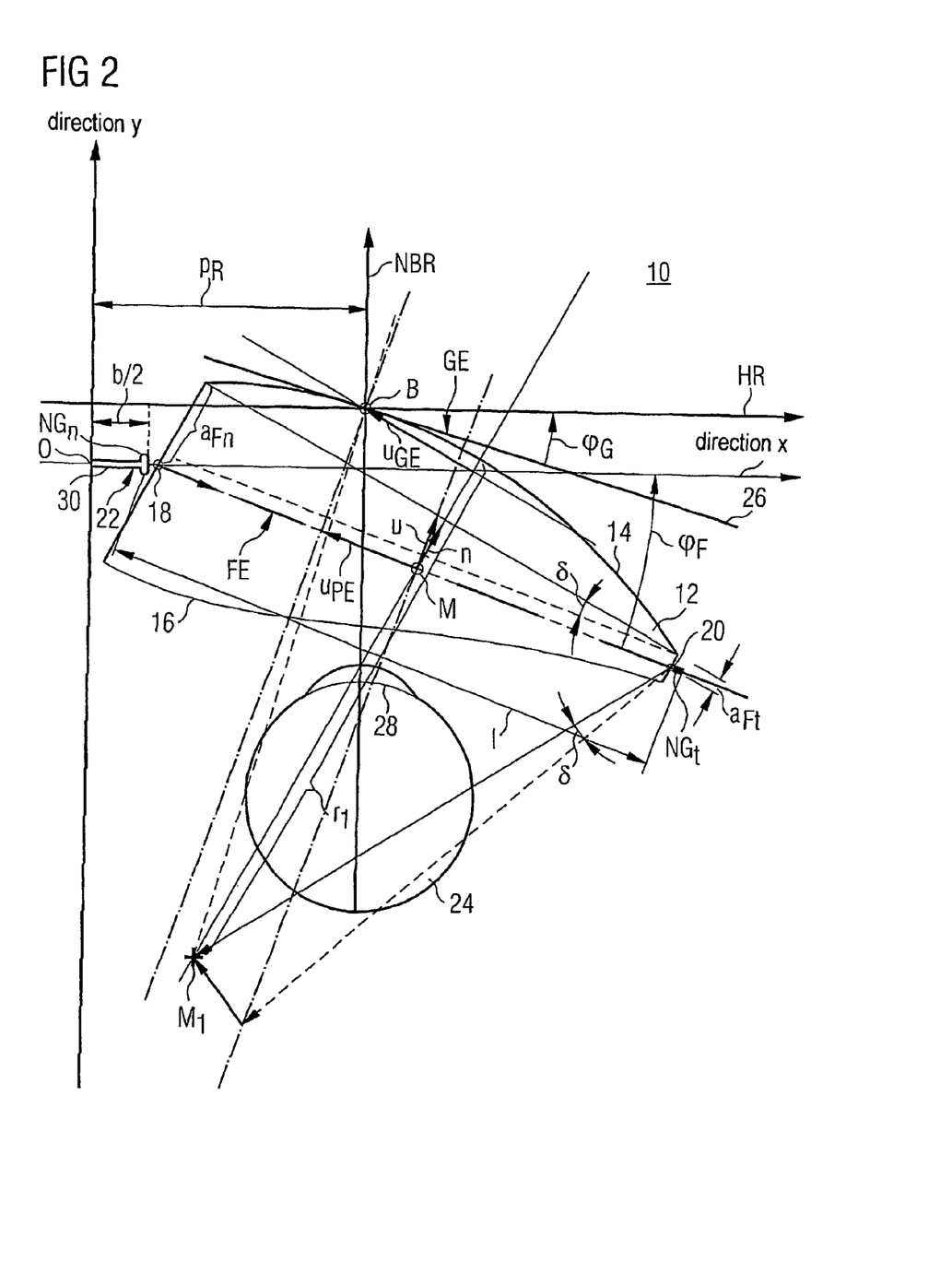
FIG. 2 shows a schematic sectional view of a preferred spectacle lens according to the present invention.

Furthermore, a temporal groove base $NG_t$ and a nasal groove base $NG_n$ are shown in FIG. 1 for each spectacle lens 12 (see FIG. 2). The bridge width b corresponds to the distance from the nasal groove base $NG_n$ to the nasal groove base $NG_n$ in a horizontal direction HR. The total interpupillary distance PD results by addition of the single interpupillary distance $p_R$ to the single interpupillary distance $p_L$.

Furthermore, a boxing center point M is shown for each spectacle lens 12 in FIG. 1, the boxing center point M in the horizontal direction HR being equal distances from the temporal groove base $NG_t$ and the nasal groove base $NG_n$. A glass length l of the spectacle lens 12 corresponds to the distance in the horizontal direction HR of the temporal groove base $NG_t$ from the nasal groove base $NG_n$.

Moreover, the horizontal distance of the centration point $Z_B$ from the boxing center point M for each spectacle lens 12 is shown. The distance is specified by $u_R$ or $u_L$ corresponding to the right or left spectacle lens 12, respectively. The distance of the centration point $Z_B$ from the boxing center point M is referred to as the decentration $u_R$ or $u_L$ from the centration point $Z_B$ in the horizontal direction HR. If the decentration $u_R$ or $u_L$ faces toward the nasal side, it has a negative value, it faces toward the temporal side, it has a positive value. The centration point ZB corresponds to the reference point B in FIG. 2.

FIG. 2 shows a device 10 according to a preferred embodiment of the present invention having a spectacle lens 12 which has an object-side face 14 and an eye-side face 16. The spectacle lens 12 is situated on a spectacle frame 22 using a nasal facet 18 and a temporal facet 20. A frame plane FE comprises the two facets 18, 20 and is perpendicular to a sectional plane which is spanned by a neutral viewing direction NBR and the horizontal direction HR. The neutral viewing direction NBR corresponds to the visual axis in the primary position of an eye 24 of the user of the spectacle lens 12. The primary position is a position of the eye 24 in relation to the head (not shown) for the case in which, with the gaze direction straight ahead, an object (not shown) is viewed which is located at eye height in relation to a vertical direction (see FIG. 3). The neutral viewing direction NBR intersects the object-side face 14 of the spectacle lens 12 at a reference point B. Furthermore, a horizontal tangent 26 of the object-side face 14 of the spectacle lens 12 at the reference point B is shown in FIG. 2. The horizontal tangent 26 encloses a horizontal tilt angle $\phi_G$ with the horizontal direction HR.

Moreover, a frame glass angle $\phi_F$ is shown in FIG. 1, which is enclosed by the horizontal direction HR and the frame plane FE. The horizontal tilt angle $\phi_G$ and the frame glass angle $\phi_F$ are typically not equal. The following equation applies for the horizontal tilt angle $\phi_G$:

$$\sin\varphi_G = \frac{p_R - m_{1x}}{r_1} = \frac{(p_R - m_{1x})BK}{525}$$

$m_{1x}$ being the coordinate in the x direction of the center point $M_1$ of a circle (not shown) on which the spherical object-side face 14 of the spectacle lens 12 lies. The parameter $r_1$ is the radius of the circle around $M_1$, i.e., the radius of curvature of the spherical object-side face in millimeters. The parameter BK represents the base curve in diopters and the parameter $p_R$ represents the value of the single interpupillary distance, i.e., the distance of the center point of a pupil 28 of the eye 24 in the horizontal direction HR from the center point of a bridge 30 of the spectacle frame 22.

For simpler understanding, in the following description, the x direction is selected as parallel to the horizontal direction HR and a y direction is selected as parallel to the neutral viewing direction NBR, a coordinate system being defined by the x and y directions. The origin O of the coordinate system corresponds to the intersection of a straight line in the y direction which runs through the center point of the bridge 30 and a straight line in the x direction which runs through the nasal facet 18.

The following equation applies for the circle center point $M_1$ of the spherical object-side face 14 of the spectacle frame 12:

$$M_1 = \begin{pmatrix} m_{1x} \\ m_{1y} \end{pmatrix} = M - (r_1 - t_{Rand} - a_{Ft})u$$

If a distance $a_{Fn}$ of the middle of the nasal facet 18 from the object-side face 14, or the edge of the object-side face 14 on the nasal side, and a distance $a_{Ft}$ of the middle of the temporal facet 20 from the object-side face 14, or the edge of the object-side face 14 on the temporal side, are not equally large, the orientation of the spectacle lens 12, in particular the object-side face 14 of the spectacle lens 12, may be described by a rotation around the temporal groove base $NG_t$ by the rotational angle δ. The following equation applies:

$$\tan\delta = \frac{a_{Fn} - a_{Ft}}{l} \Rightarrow \delta = \arctan\frac{a_{Fn} - a_{Ft}}{l},$$

the vector $PM_1=M_1-P$ being rotated around the angle δ, P representing the vector of the temporal groove base. The following equations apply:

$$M_1 = \begin{pmatrix} m_{1x} \\ m_{1y} \end{pmatrix} = M - (r_1 - t_{Rand} - a_{Ft})u \text{ and}$$

$$P = \begin{pmatrix} p_x \\ p_y \end{pmatrix} = \begin{pmatrix} \frac{b}{2} + l\cos\varphi_F \\ -l\sin\varphi_F \end{pmatrix} = \begin{pmatrix} \frac{b}{2} + lu_y \\ -lu_x \end{pmatrix},$$

moreover, the following equation applying for the boxing center point M:

$$M = \begin{pmatrix} m_x \\ m_y \end{pmatrix} = \begin{pmatrix} \frac{b}{2} + \frac{l\cos\varphi_F}{2} \\ \frac{-l\sin\varphi_F}{2} \end{pmatrix} = \frac{1}{2}\begin{pmatrix} \frac{b}{2} + lu_y \\ -lu_x \end{pmatrix}.$$

The parameter $t_{Rand}$ is the vertex depth of the front face, i.e., the object-side face 14 of the spectacle glass 12 at the outer temporal groove base $NG_t$, $t_{Rand}$ being given by:

$$t_{Rand} = r_1 - r_1\sqrt{1 - 0.25\frac{l^2}{r_1^2}}.$$

Therefore, the following equation applies after the rotation for the center point $M_1$ of the object-side face 14:

$$M_1 = M + \begin{pmatrix} \cos\delta & \sin\delta \\ -\sin\delta & \cos\delta \end{pmatrix}\Delta r = \begin{pmatrix} m_x + \cos\delta\Delta x + \sin\delta\Delta y \\ m_y - \sin\delta\Delta x + \cos\delta\Delta y \end{pmatrix},$$

the following equation applying for Δr:

$$\Delta r = M_1 - P = \begin{pmatrix} \Delta x \\ \Delta y \end{pmatrix}\begin{pmatrix} m_{1x} - p_x \\ m_{1y} - p_y \end{pmatrix}.$$

The following equation applies for the reference point B:

$$B = \begin{pmatrix} m_{1x} + r_1\sin\varphi_G \\ m_{1y} + r_1\cos\varphi_G \end{pmatrix} = \begin{pmatrix} p_R \\ m_{1y} + r_1\cos\varphi_G \end{pmatrix}.$$

As may be seen from FIG. 2, different values typically result for the frame glass angle $\varphi_F$ and the horizontal tilt angle $\varphi_G$. If the object-side face 14 of the spectacle lens 12 is situated at an angle different from 90° to the neutral viewing direction NBR, parasitic optical properties arise. In other words, parasitic optical properties arise if the horizontal tilt angle $\varphi_G$ is not equal to 0° and, as a result, the parasitic optical properties have to be corrected in accordance with the horizontal tilt angle $\varphi_G$. A correction corresponding to the frame glass angle $\varphi_F$ only results in correct values if the frame glass angle $\varphi_F$ and the horizontal tilt angle $\varphi_G$ are identical.

If the spectacle lens 12 is situated in a frame 22, a correction of the interpupillary distance PD must also be performed for fitting purposes. For this purpose, one differentiates between two methods, horizontal decentration in the frame plane FE and horizontal decentration in a tangential plane GE of the spectacle lens 12. In horizontal decentration in the frame plane FE, the distance of the reference point B of a straight line through the boxing center point M having the direction vector u is defined, the following equation applying:

$$u_{FE}=(b_x-m_x)u_y-(b_y-m_y)u_x.$$

The boxing center point M corresponds to the boxing center point described above, the frame glass angle $\varphi_F$ being taken into consideration. Furthermore, u is the direction vector perpendicular to the frame plane FE, the following equation applying:

$$u = \begin{pmatrix} u_x \\ u_y \end{pmatrix} = \begin{pmatrix} \sin\varphi_F \\ \cos\varphi_F \end{pmatrix}.$$

In the method of horizontal decentration in the tangential plane GE of the spectacle lens 12, the distance of the reference point B from a straight line through the boxing center point M having direction vector n is defined, the following equation applying:

$$u_{GE}=(b_x-m_x)n_y-(b_y-m_y)n_x.$$

The following equation applies for the direction vector n:

$$n = \frac{M - M_1}{|M - M_1|}.$$

The tangential plane GE is perpendicular to the x-y plane. Furthermore, the vector u is in the tangential plane.

Taking the horizontal tilt angle $\varphi_G$ into consideration, a corrected single interpupillary distance $p'_R$ may be calculated, the corrected single interpupillary distance $p'_R$ resulting from the value of the single interpupillary distance $p_R$. The following equation applies:

$$p'_R=p_R+u_{FE}-u_R$$

Or the following equation applies $$p'_R=p_R+u_{GE}-u_R,$$

depending on which method is used to calculate the decentration. A corrected single interpupillary distance $p'_L$ is calculated analogously. A corrected interpupillary distance results from the sum of the corrected single interpupillary distance $p'_L$ with the corrected single interpupillary distance $p'_R$.

In an edged spectacle lens 12, in which the facets do not run parallel to the front face everywhere, the values for $u_{FE}$ and $u_{GE}$ differ. Therefore, different values result for the corrected interpupillary distance $p'_R$ or $p'_L$ for different decentration methods.

Figure 3:
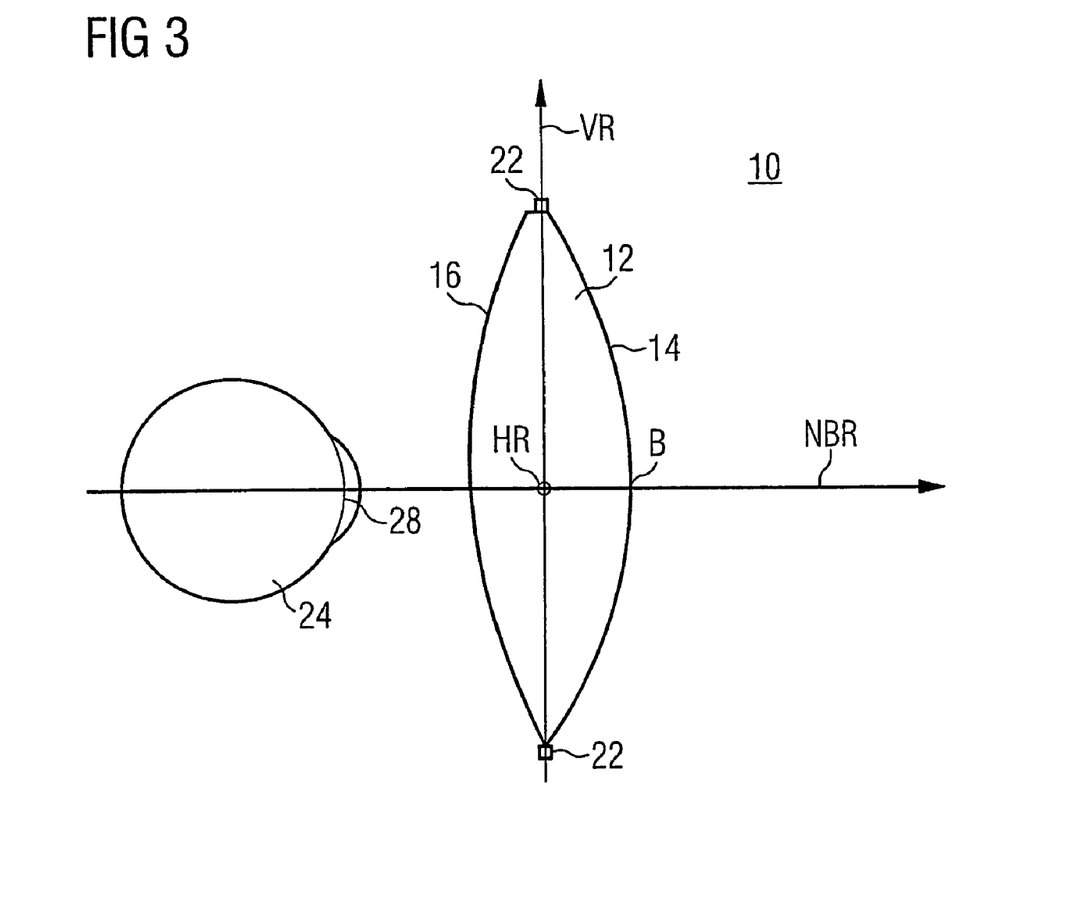
FIG. 3 shows a schematic sectional view of a preferred embodiment of the present invention according to FIG. 2.

FIG. 3 shows a sectional view of a preferred embodiment of the present invention along a plane which is spanned by the neutral viewing direction NBR and a vertical direction VR. The vertical direction VR runs perpendicularly to the neutral viewing direction NBR and perpendicular to the horizontal direction HR. The horizontal direction HR therefore runs perpendicular to the plane of the drawing of FIG. 3.

Tables 1 through 4 show examples of the horizontal tilt angle $\phi_G$ and the corrected interpupillary distance for predetermined base curves and given values for the frame glass angle $\phi_F$ for two different spectacle frames, which are identified as frame 50-16 and frame 60-16, the bridge width b, glass length I, and the position of the nasal base groove $NG_n$ and the temporal base groove $NG_t$ being known.

The present invention is not restricted to the embodiment described above, in particular not to the definition and/or predefinition of the horizontal tilt angle. Rather, the tilt angle may also be defined and/or predefined in arbitrary other directions and a corresponding optical correction may be performed. Furthermore, the optical correction may also be calculated at a point other than the reference point B. In particular, the correction may be calculated for the entire eye-side face 14.

LIST OF REFERENCE SIGNS

| | |
|---|---|
| 10 | device |
| 12 | spectacle lens |
| 14 | object-side face |
| 16 | eye-side face |
| 18 | nasal facet |
| 20 | temporal facet |
| 22 | spectacle frame |
| 24 | eye |
| 26 | tension |
| 28 | pupil |
| 30 | bridge |
| FE | frame plane |
| GE | tangential plane |
| NBR | neutral viewing direction |
| HR | horizontal direction |
| VR | vertical direction |
| B | reference point |
| $\phi_G$ | horizontal tilt angle |
| $\phi_F$ | frame glass angle |
| M | boxing center point |
| $NG_n$ | nasal base groove |
| $NG_t$ | temporal base groove |
| PD | total interpupillary distance |
| $p_R, p_L$ | single interpupillary distance |
| $p'_R, p'_L$ | corrected single interpupillary distance |
| $u_R, u_L$ | decentration |
| O | origin |

TABLE 1

Frame 50-16 interpupillary distance 30

| | | Base curve 8 |
|---|---|---|
| FSW 5° | | $\phi_G$ 2.04° |
| | corrected | PD 29.61 |
| FSW 10° | | $\phi_G$ 6.85° |
| | corrected | PD 29.40 |
| FSW 20° | | $\phi_G$ 16.91° |
| | corrected | PD 29.46 |

TABLE 2

Frame 50-16 interpupillary distance 33

| | | Base curve 8 |
|---|---|---|
| FSW 5° | | $\phi_G$ 4.67° |
| | corrected | PD 32.62 |
| FSW 10° | | $\phi_G$ 9.50° |
| | corrected | PD 32.43 |
| FSW 20° | | $\phi_G$ 19.67° |
| | corrected | PD 32.62 |

TABLE 3

Frame 60-16 interpupillary distance 34

| | | Base curve 8 |
|---|---|---|
| FSW 5° | | $\phi_G$ 1.01° |
| | corrected | PD 33.43 |
| FSW 10° | | $\phi_G$ 5.69° |
| | corrected | PD 33.07 |
| FSW 20° | | $\phi_G$ 15.56° |
| | corrected | PD 32.92 |

TABLE 4

Frame 60-16 interpupillary distance 38

| | | Base curve 8 |
|---|---|---|
| FSW 5° | | $\phi_G$ 4.51° |
| | corrected | PD 37.44 |
| FSW 10° | | $\phi_G$ 9.21° |
| | corrected | PD 37.10 |
| FSW 20° | | $\phi_G$ 19.22° |
| | corrected | PD 37.10 |

The invention claimed is:
1. A method having the following steps:
predefining a bridge width (b), a glass length (I) and a frame glass angle ($\phi_F$) as spectacle frame data;
predefining a base curve (BK) and a nasal and temporal facet position ($a_{Fn}$, $a_{Ft}$) as spectacle lens data;
predefining an interpupillary distance ($p_L$, $p_R$) of the user as user data;
determining a horizontal tilt angle ($\phi_G$) of the spectacle lens in the wearing position at a reference point, wherein
the reference point is the intersection of the eye-side horizontal main beam in the neutral viewing direction (NBR) of the user with the object-side face of the spectacle lens,
the horizontal tilt angle ($\phi_G$) is the angle which is enclosed by a horizontal tangent of the object-side face of the spectacle lens at the reference point (B) with a straight horizontal reference line (HR), and
the straight horizontal reference line (HR) lies in a plane which is perpendicular to the horizontal main beam in the neutral viewing direction (NBR) of the user; and
manufacturing the defined spectacle lens.
2. The method according to claim 1 having the following further steps:
predefining the dimensions of the optical defective vision of the user as further user data;
determining the spectacle lens starting from the predefined spectacle frame data, spectacle lens data, and user data taking the horizontal tilt angle ($\phi_G$) into consideration.

3. The method according to claim 1, having the following further step of determining a corrected interpupillary distance ($p'_L$, $p'_R$) starting from the interpupillary distance ($p_L$, $p_R$) of the user taking the horizontal tilt angle ($\phi_G$) into consideration, wherein the corrected interpupillary distance ($p'_L$, $p'_R$) is usable for fitting the spectacle lens into a spectacle frame.

4. A method for determining a spectacle lens having the following steps:
- predefining a bridge width (b), a glass length (I) and a frame glass angle ($\phi_F$) as spectacle frame data;
- predefining a base curve (BK) and a nasal and temporal facet position ($a_{Fn}$, $a_{Ft}$) as spectacle lens data;
- predefining an interpupillary distance ($p_L$, $p_R$) and dimensions of the optical defective vision of the user as user data;
- predefining a horizontal tilt angle ($\phi_G$) of the spectacle lens in the wearing position at a reference point (B);
- determining, by a spectacle lens definition unit, the spectacle lens starting from the predefined spectacle frame data, spectacle lens data, and user data taking the horizontal tilt angle ($\phi_G$) into consideration, wherein
  - the reference point (B) is the intersection of the eye-side horizontal main beam in the neutral viewing direction (NBR) of the user with object-side face of the spectacle lens;
  - the horizontal tilt angle ($\phi_G$) is the angle which is enclosed by a horizontal tangent of the object-side face of the spectacle lens at the reference point (B) with a straight horizontal reference line (HR), and
  - the straight horizontal reference line (HR) lies in a plane which is perpendicular to the horizontal main beam in the neutral viewing direction (NBR) of the user.

5. A method for providing a pair of spectacles having the following steps:
- predefining the spectacle lens, which is defined starting from predefined spectacle frame data, spectacle lens data, and user data taking a horizontal tilt angle at a reference point (B) into consideration,
- fitting, by a spectacle lens fitting unit, the spectacle lens into a spectacle frame on the basis of a corrected interpupillary distance ($p'_L$, $p'_R$), wherein
  - the corrected interpupillary distance ($p'_L$, $p'_R$) is defined starting from the interpupillary distance ($p_L$, $p_R$) of the user taking the horizontal tilt angle ($\phi_G$) into consideration,
  - the reference point (B) is the intersection of the eye-side horizontal main beam in the neutral viewing direction (NBR) of the user with object-side face of the spectacle lens;
  - the horizontal tilt angle ($\phi_G$) is the angle which is enclosed by a horizontal tangent of the object-side face of the spectacle lens at the reference point (B) with a straight horizontal reference line (HR), and
  - the straight horizontal reference line (HR) lies in a plane which is perpendicular to the horizontal main beam in the neutral viewing direction (NBR) of the user.

6. A device having
- a spectacle frame data detection unit, which is designed to detect a bridge width (b), a glass length (I) and a frame glass angle ($\phi_F$) as spectacle frame data;
- a spectacle lens detection unit, which is designed to detect a base curve (BK) and a nasal and temporal facet position ($a_{Fn}$, $a_{Ft}$) as spectacle lens data;
- a user data detection unit, which is designed to detect an interpupillary distance ($p_L$, $p_R$) of the user as user data;
- a tilt angle definition unit, which is designed to define a horizontal tilt angle ($\phi_G$) of the spectacle lens in the wearing position at a reference point (B), wherein
  - the reference point (B) is the intersection of the eye-side horizontal main beam in the neutral viewing direction (NBR) of the user with object-side face of the spectacle lens;
  - the horizontal tilt angle ($\phi_G$) is the angle which is enclosed by a horizontal tangent of the object-side face of the spectacle lens at the reference point (B) with a straight horizontal reference line (HR), and
  - the straight horizontal reference line (HR) lies in a plane which is perpendicular to the horizontal main beam in the neutral viewing direction (NBR) of the user.

7. The device according to claim 6 having a spectacle lens definition unit, which is designed to define the spectacle lens starting from the predefined spectacle frame data, spectacle lens data, and user data taking the horizontal tilt angle ($\phi_G$) into consideration, wherein the user data detection unit is also designed to detect dimensions of the optical defective vision of the user as further user data.

8. The device according to claim 7 having a spectacle lens manufacturing unit, which is designed to manufacture the defined spectacle lens.

9. The device according to claim 7 having:
- an interpupillary distance direction unit, which is designed to define a corrected interpupillary distance ($p'_L$, $p'_R$), starting from the interpupillary distance ($p_L$, $p_R$) of the user taking the horizontal tilt angle ($\phi_G$) into consideration, wherein the corrected interpupillary distance ($p'_L$, $p'_R$) is usable for fitting the spectacle lens in a spectacle frame.

10. The device according to claim 9 having a spectacle lens fitting unit, which is designed for fitting the spectacle lens in a spectacle frame on the basis of the corrected interpupillary distance ($p'_L$, $p'_R$).

11. A computer program product comprising program parts which, when loaded in a computer, is designed for executing a method comprising:
- predefining a bridge width (b), a glass length (I) and a frame glass angle ($\phi_G$) as spectacle frame data;
- predefining a base curve (BK) and a nasal and temporal facet position ($a_{Fn}$, $a_{Ft}$) as spectacle lens data;
- predefining an interpupillary distance ($p_L$, $p_R$) of the user as user data;
- determining a horizontal tilt angle ($\phi_G$) of the spectacle lens in the wearing position at a reference point, wherein
  - the reference point is the intersection of the eye-side horizontal main beam in the neutral viewing direction (NBR) of the user with the object-side face of the spectacle lens;
  - the horizontal tilt angle ($\phi_G$) is the angle which is enclosed by a horizontal tangent of the object-side face of the spectacle lens at the reference point (B) with a straight horizontal reference line (HR), and
  - the straight horizontal reference line (HR) lies in a plane which is perpendicular to the horizontal main beam in the neutral viewing direction (NBR) of the user.

* * * * *